Feb. 24, 1970

C. A. SAMHAMMER 3,497,041

LUGGAGE CASES

Filed May 22, 1967

INVENTOR.
CLAIR A. SAMHAMMER
BY
Van Voorhenburgh & Lowe

ATTORNEYS

Feb. 24, 1970   C. A. SAMHAMMER   3,497,041
LUGGAGE CASES
Filed May 22, 1967   5 Sheets-Sheet 2
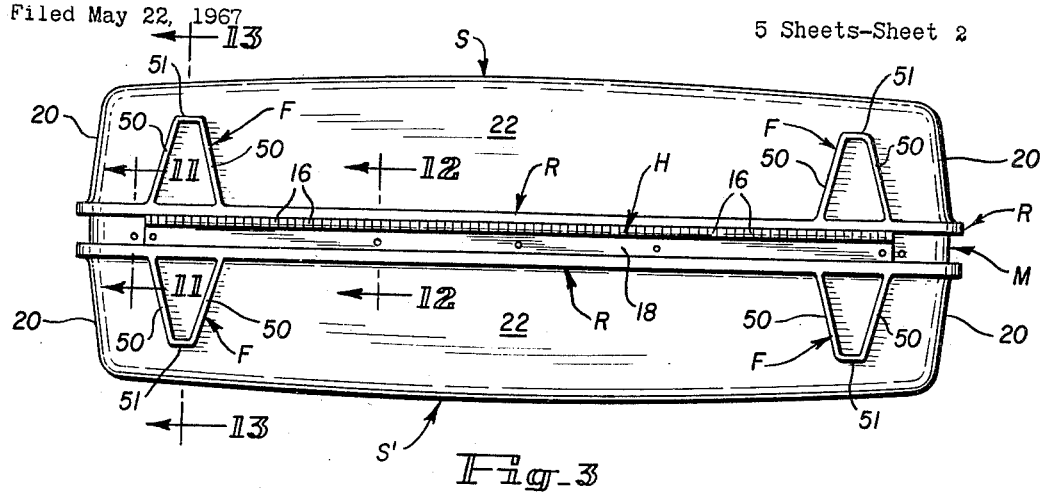
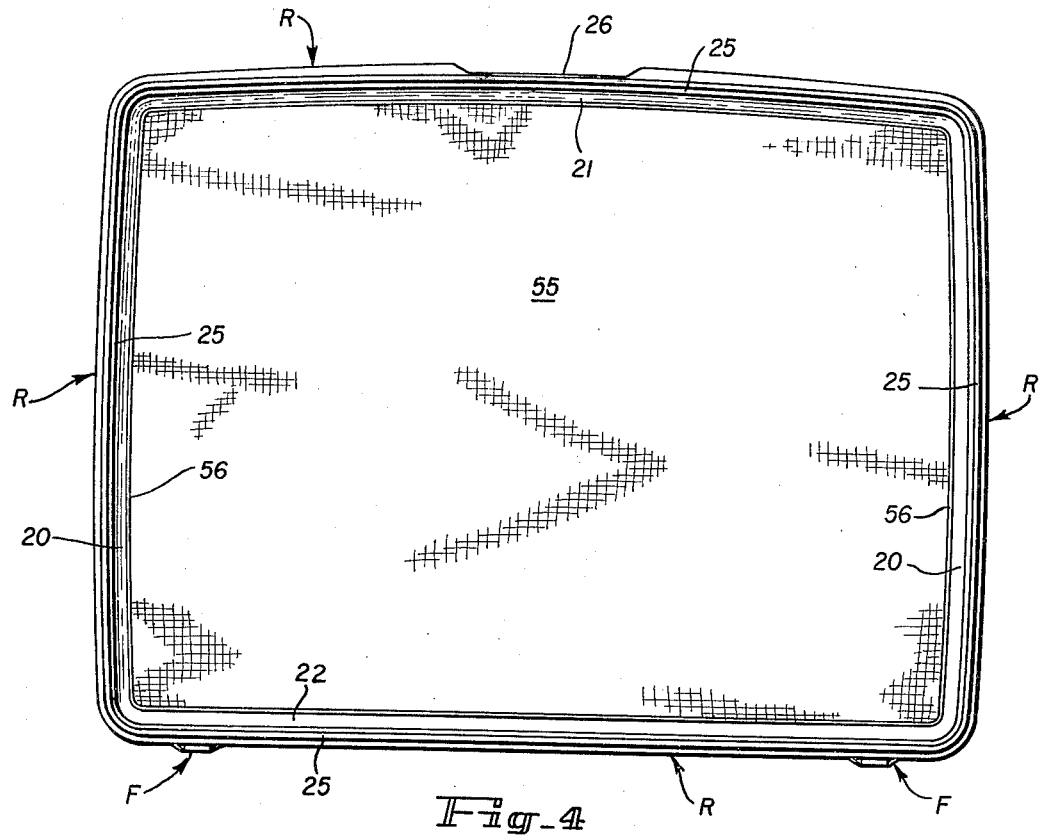
INVENTOR.
CLAIR A. SAMHAMMER
BY
Van Valkenburgh & Lowe
ATTORNEYS Feb. 24, 1970     C. A. SAMHAMMER     3,497,041
LUGGAGE CASES
Filed May 22, 1967     5 Sheets-Sheet 4
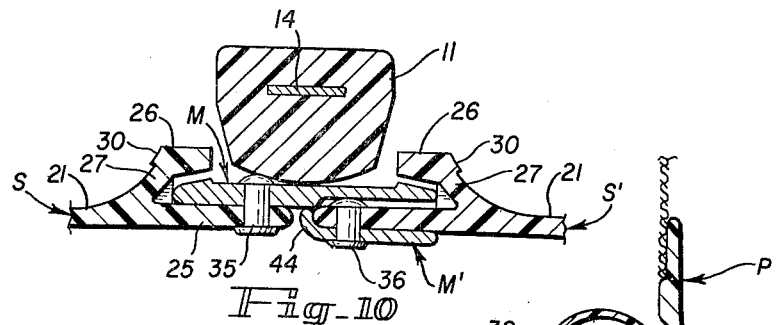
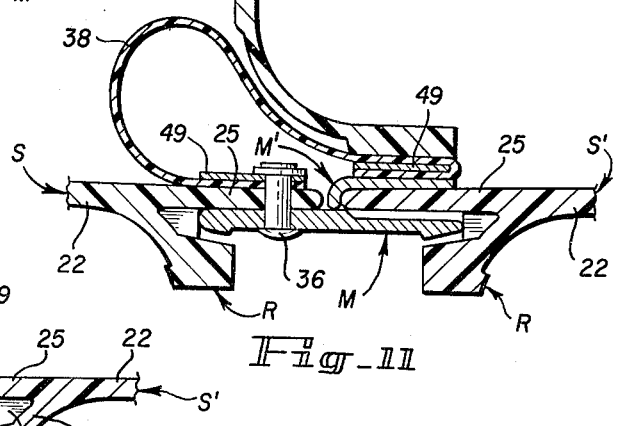
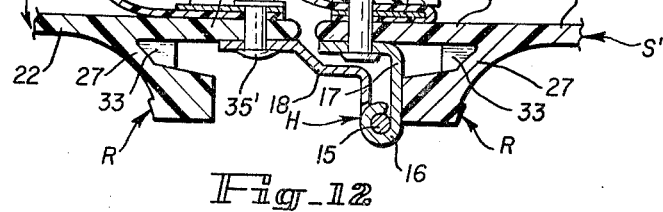
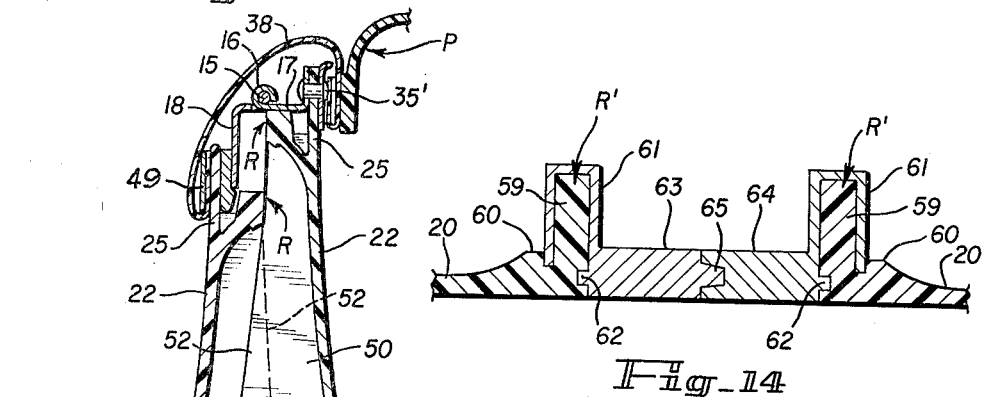
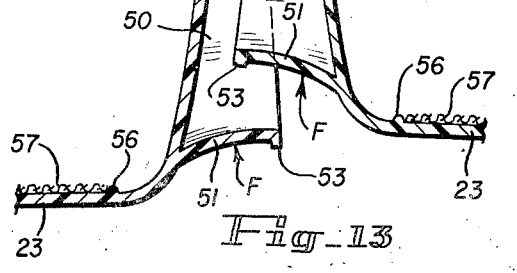
INVENTOR.
CLAIR A. SAMHAMMER
BY
Van Valkenburgh & Lowe
ATTORNEYS

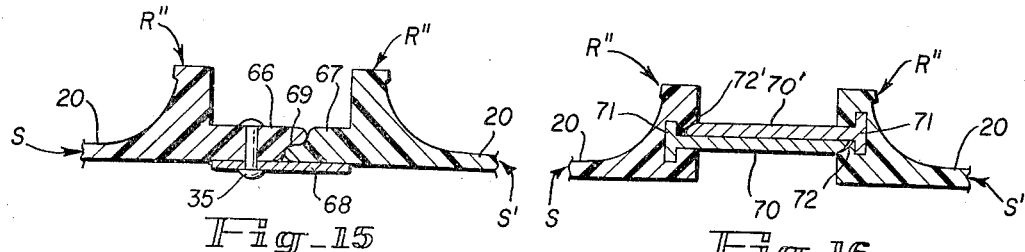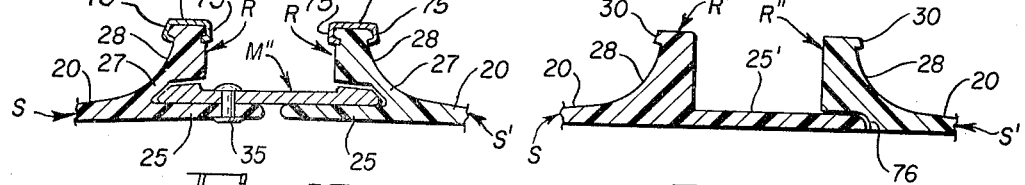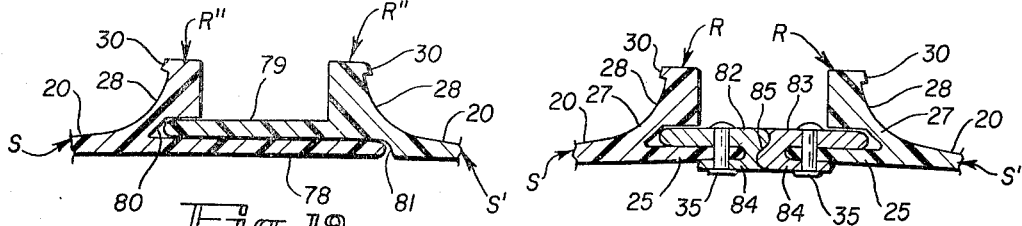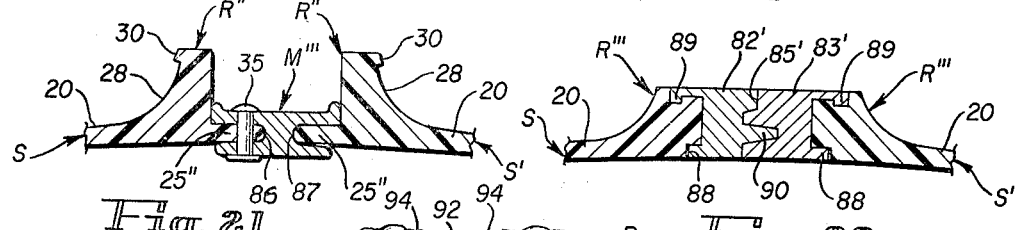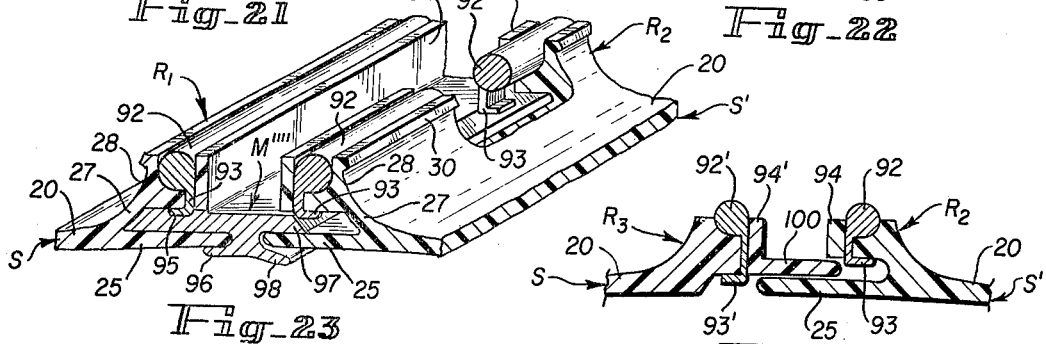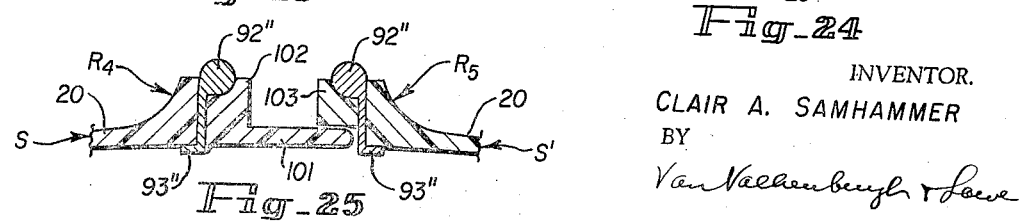

United States Patent Office 3,497,041
Patented Feb. 24, 1970

3,497,041
LUGGAGE CASES
Clair A. Samhammer, Orange, Calif., assignor to Samsonite Corporation, Denver, Colo., a corporation of Colorado
Filed May 22, 1967, Ser. No. 640,035
Int. Cl. A45c *13/36;* B65d *43/16*
U.S. Cl. 190—18    18 Claims

ABSTRACT OF THE DISCLOSURE

A luggage case including shells having a frame or reinforcing means integral therewith, such as outwardly or inwardly extending ribs. A hardware mounting strip attached to one of the shells may extend into a groove formed beneath the rib and attached to a lateral flange, and also extend into a corresponding groove in the opposite shell, when the case sections are closed. The feet or glides at the bottom may be integral with the shells and also merge into the ribs. When the feet or glides are identical on the two shells, an off-center hinge is used to prevent direct abutment of one foot against another, when the case sections are opened. Numerous variations in the ribs and flanges are shown, including rod-like members having depending hooks embedded in the ribs, as well as hardware mounting strips embedded in the ribs.

---

This invention relates to luggage cases.

A luggage case comprises essentially two opposed concave sections which abut or otherwise fit together around the edges thereof, when the case is closed, and are hinged together along one edge. Thus, the case may be opened by suitable movement of the case sections about the hinge, so that desired articles, such as clothing or toilet articles, may be placed in or removed from the respective case sections. The case sections are also normally removably attached together at the edge opposite the hinge, as by locks or latches, while a carrying handle is also provided, normally being attached to one of the case sections centrally of the same edge as the locks or latches. For several years, each case section has included a concave shell which has been formed from a layer of metal, such as an aluminum-magnesium alloy, formed to shape, and a wear resistant layer of plastic, such as a vinyl copolymer, applied to the outside of the metal shell. Such shells are also formed by molding sheets of a suitable plastic, such as the acrylonitrile butadiene styrene copolymer known as ABS. The peripheral edges of such shells are attached to a strip, usually of metal, such as a magnesium alloy, extruded to obtain the desired cross-sectional configuration. The edges of such shells are trimmed, the thickness of the shell at the edge being essentially the same as at other areas, so that the edge of the shell will fit into a longitudinal extending groove in the strip or extrusion. The strips for the opposite shells differ, since a tongue and groove type of fit is preferred, while one of the strips may be wider than the other, to permit the locks or latches and the handle to be attached to the wider strip. The most popular luggage case in the world, from the standpoint of sales, is that of the Willard G. Axtell U.S. Patent No. 2,950,793 in which the above construction is employed, with the configuration of the strips being such that a longitudinally extending recess is provided, in which the handle, locks or latches and hinges are disposed. However, the bending of such extruded strips, particularly to conform to the rounded corners of the shells, requires care and precision in manufacturing, which adds to the manufacturing cost. Also, the cost of the extruded strips themselves adds to the cost of manufacturing.

The forming of the shells from sheets of material, either metal or plastic, requires a trimming operation, which produces an unavoidable amount of waste material, which also increases the cost of manufacturing, Such waste material, through trimming, might be avoided by injection molding of the shells, but injection molded shells, similar to the above described shells, do not have the strength and stability to withstand the rigors of hard usage. Thus, such injection molded shells would normally require the reinforcement provided by extruded strips of substantial width and thickness.

Among the objects of the present invention are to provide a novel luggage case; to provide such a luggage case which includes shells formed in a manner which adds rigidity and strength to the shell, particularly reinforcing means integral with the shell; to provide such a luggage case in which the shells are readily provided with hardware mounting means along the peripheral edges, as by strips formed of metal or other suitable material; to provide such a luggage case in which a longitudinal groove or recess for receiving the hinge or hinges and also the locks or latches, as well as the handle support, is formed primarily by the shells themselves; to provide such a luggage case in which the shells are complementary, in most forms, so that the same mold may be used for producing both shells; to provide such a luggage case in which the shells are particularly adapted to be formed by injection molding; to provide such a luggage case in which an interlocking action between the two halves is secured; to provide such a luggage case in which the operations incident to attaching hardware mounting strips to the shells are easily and readily carried out; to provide such a luggage case in which each section may be manufactured separately and the two sections finally attached together by a hinge pin; to provide such a luggage case which permits numerous variations in construction, particularly around the edges of the case sections; and to provide such a luggage case which is relatively simple in construction, durable in use and economical to manufacture.

The foregoing and additional objects of this invention, together with the novel features thereof, will become apparent from the description which follows, taken in conjunction with the accompanying drawings, in which:

FIG. 3 is a bottom plan view of the luggage case of FIG. 1;

FIG. 4 is a side elevation, looking from the inside, of a shell of the luggage case of FIG. 1;

FIG. 10 is a central fragmentary section, on an enlarged scale, taken along line 10—10 of FIG. 2 at the position of the handle;

FIG. 11 is a central fragmentary section, on an enlarged scale, along line 11—11 of FIG. 3 at the bottom but outwardly from the hinge;

FIG. 12 is a central fragmentary section, on an enlarged scale, taken along line 12—12 of FIG. 3, showing also the preferred construction of the hinge;

FIG. 13 is a central fragmentary section, on an enlarged scale, taken along line 13—13 of FIG. 3 at the position of a pair of supporting feet, but with the luggage case sections in open position, to illustrate the manner in which the supporting feet intersect, to act as a stop in limiting the opening movement;

FIG. 14 is a central fragmentary section, similar to FIG. 6, but illustrating an alternative construction in which the hardware mounting strips are attached to the shells during molding;

FIG. 15 is a central fragmentary section, similar to FIG. 6, but illustrating an alternative construction;

FIG. 16 is a central fragmentary section, similar to FIG. 14, but illustrating an alternative construction;

FIG. 17 is a central fragmentary section, similar to FIG. 6, illustrating an alternative construction of the shells and a single hardware mounting;

FIG. 18 is a central fragmentary section, similar to FIG. 6, but illustrating another alternative construction of the shells;

FIG. 19 is a central fragmentary section, similar to FIG. 18, but illustrating a further alternative shell construction;

FIG. 20 is a central fragmentary section, similar to FIG. 6, but illustrating a further alternative construction of the shells and interfitting hardware mounting strips;

FIG. 21 is a central fragmentary section, similar to FIG. 20, but illustrating a further alternative construction in which a single hardware mounting strip is utilized;

FIG. 22 is a central fragmentary section, similar to FIG. 20, but illustrating a further alternative construction;

FIG. 23 is a fragmentary perspective view containing a section similar to FIG. 22, but broken away to show the construction more clearly, illustrating a further alternative construction;

FIG. 24 is a central fragmentary section, similar to FIG. 19, but illustrating a further alternative construction; and FIG. 25 is a central fragmentary section similar to FIG. 24, but illustrating a still further alternative construction.

Figure 1:
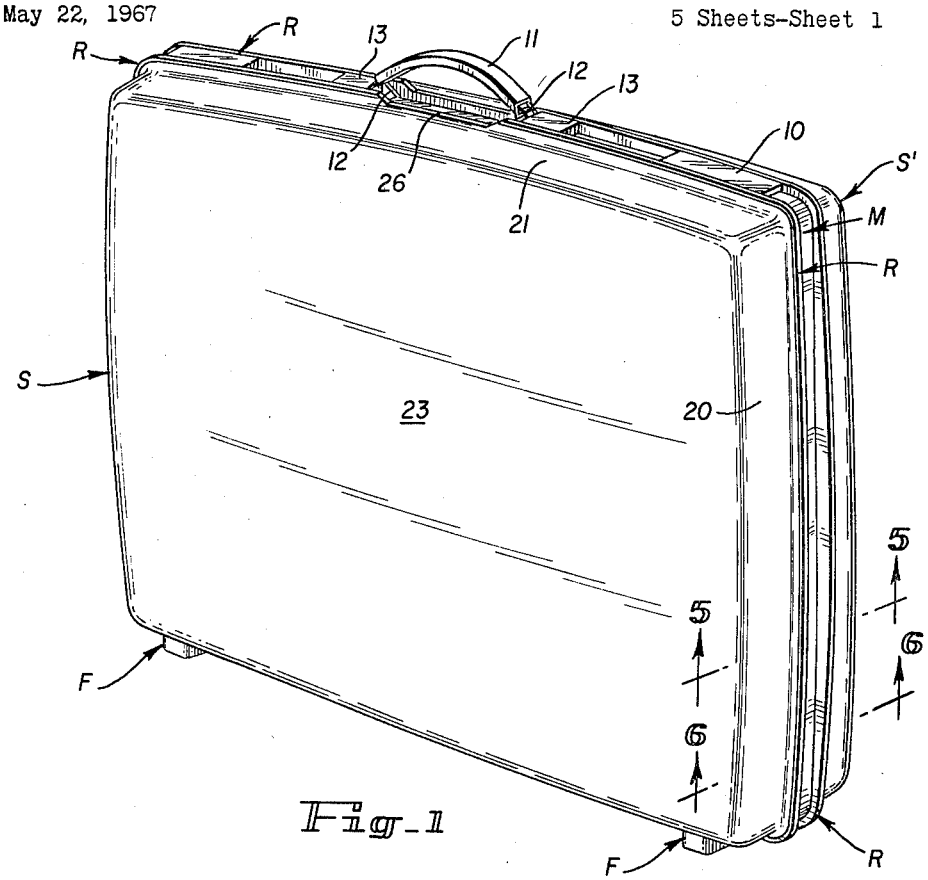
FIG. 1 is a three-quarter side perspective view of a luggage case constructed in accordance with this invention.
Figure 2:
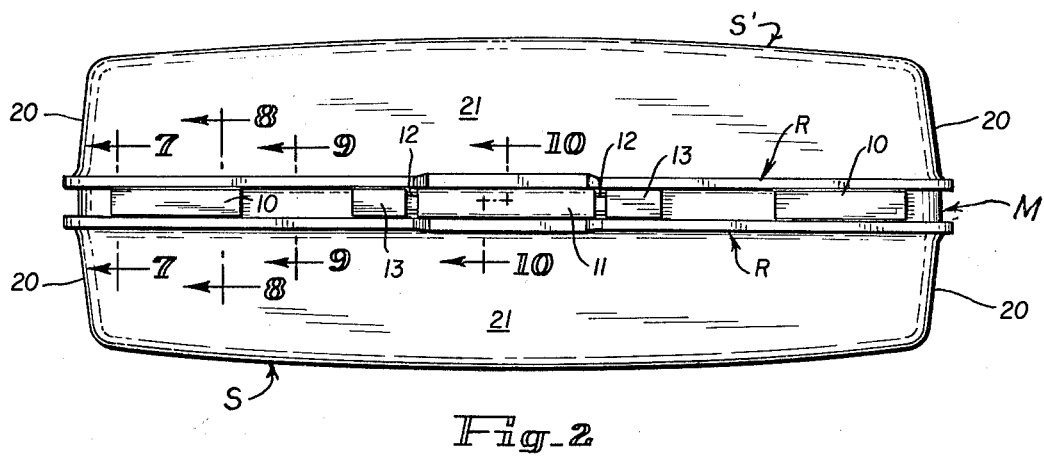
FIG. 2 is a top plan view of the luggage case of FIG. 1.
Figure 5:
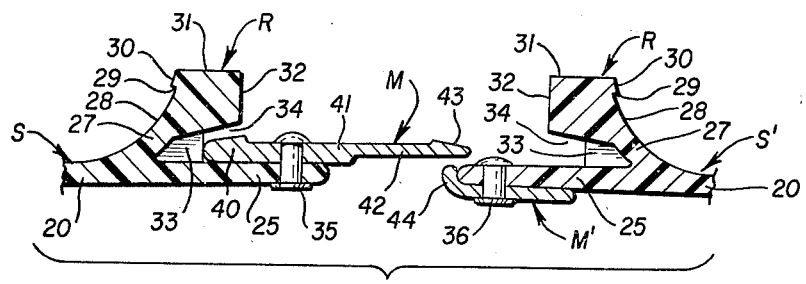
FIG. 5 is a central fragmentary section, on an enlarged scale, taken along line 5—5 of FIG. 1 at one end of the luggage case, but showing the two sections of the luggage case slightly apart, as during opening or closing of the luggage case.
Figure 6:
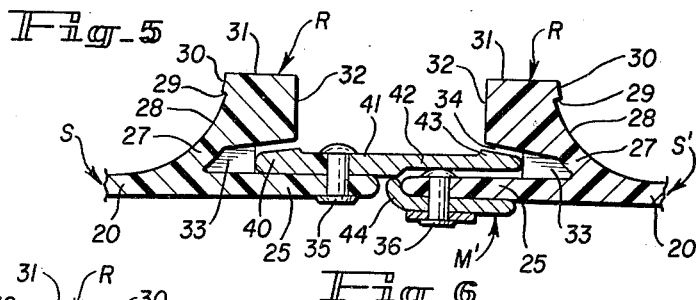
FIG. 6 is a central fragmentary section, on an enlarged scale, taken along line 6—6 of FIG. 1 at one end of the luggage case.
Figure 7:
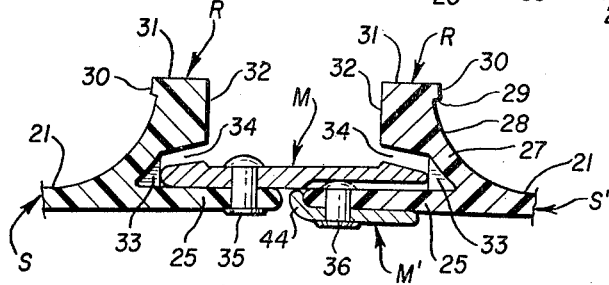
FIG. 7 is a central fragmentary section, on an enlarged scale, taken along line 7—7 of FIG. 2 at the top of the luggage case but adjacent one end.

A luggage case constructed in accordance with this invention, as illustrated in FIGS. 1–3, may comprise a pair of concave shells S and S' which may be formed identically, as by injection molding, but are placed in opposed complementary positions. The shells are suitably connected together at the bottom, as by a hinge H of FIG. 3, and are detachably connected at the top by a pair of latches 10, as well as being provided with a handle 11. The latches 10 may be of any suitable type, such as the construction of the Garmon and Axtell U.S. Patent No. 3,034,327, while each end of handle 11 may be connected to a link 12 received in a handle support 13, with a spring 14, as in FIG. 10, embedded in the material of the handle, such as plastic, so that the handle may be pulled upwardly to the carrying position of FIG. 1, but when released, will be moved down by the spring to a retracted position. The hinge H is conveniently a piano type hinge, as in FIG. 3, having an elongated hinge pin 15 of FIG. 12, which may be inserted between ears 16 of the two halves 17 and 18 of the hinge as the last operation to connect the two sections of the case together, so that each section may be handled independently, as for installation of the latches, handle, the respective hinge halves and other parts which are attached to the shells. Each shell S and S' may be provided with a pair of depending feet F, on which the luggage case is supported when in upright position, as in FIG. 1. Each foot F is conveniently molded integrally with the corresponding shell S or S', although other configurations of a foot F may be utilized.

Each shell S and S' has end walls 20 and top and bottom walls 21 and 22, the end, top and bottom walls being integral with a side wall 23, which is convex on the outside, in both directions, as in FIGS. 2 and 3. The side wall merges with the end, top and bottom walls at rounded corners, as shown. The shells S and S' are formed of a plastic suitable for injection molding, such as polypropylene, with the outside of the shell being provided, during molding, with any desired decorative effect, such as pebbled or grained surface to simulate leather. Also, a suitable coloring material or pigment may be mixed with the polypropylene or other plastic, in order to produce a desired color of the shell.

In accordance with this invention, the shells S and S' are provided, around the peripheral edges, with integral reinforcing means, such as an outwardly extending rib R, as in FIGS. 5–9. In general, the thickness in both directions of each rib R is greater than the thickness of the shell walls, and each outside rib R resists deformation of the shell. For installation of hardware mounting strips M and M', each shell may have a laterally extending flange 25, which may also be considered as merely an extension of the corresponding shell, with flanges 25 of each shell extending toward the opposite shell in opposed relation. Rib R, as in FIG. 1, may extend outwardly from the adjacent bottom wall and end wall for approximately the same distance, but along the top may increase in height from each end toward the center, as in FIGS. 1 and 4, to a central depressed portion 26 corresponding in length to the distance between handle supports 12, in order to provide a space at each side for access to handle 11 by the user, permitting the latter to more readily grasp the handle and pull it upwardly for carrying purposes. As in FIGS. 2 and 10, the central depressed portion 26 of each rib may also be wider in appearance than the remainder of the rib. Each rib R, as in FIGS. 5–12, is connected to the corresponding shell by a throat section 27 which is concave on the outside along outer surface 28 which curves outwardly to a shoulder 29 forming the inner edge of a lateral boss 30, whose outer surface may be smooth to provide a decorative contrast with the grained or pebbled surfaces of the shell walls. The outside edge 31, as well as the inner edge 32 of the rib, may also be smooth for decorative contrast. At the depressed portion 26, the lateral boss 30 is inclined laterally, as in FIG. 10, which gives the depressed portion the appearance of a greater width than the remainder of the rib. The laterally extending flange 25 is overhung by rib R and connected thereto at spaced positions by a series of radial ribs 33 within a groove 34, formed between the overhanging rib R and the laterally extending flange 25.

Each shell is provided with a hardware mounting strip, as indicated previously, such as strip M attached to the flange 25 of shell S and hardware mounting strip M' attached to the flange 25 of shell S'. Any suitable type of attaching device may be utilized, such as rivets 35 and 36 of FIGS. 5–7 and 10, located at appropriate spaced positions around the respective flange and along the top and end walls and the lower corners to the position of hinge H. Along the bottom, the respective halves 17 and 18 of the hinge H are attached to flanges 25 by rivets 35', as in FIGS. 12 and 13, with longer rivets 37, as in FIG. 12, utilized at appropriate spaced positions along the bottom to attach divider pad P and an apron 38 on the inside of shell S'. Strips M and M' each extend past each end of hinge H, as to beneath feet F, so that the strips will each be connected to each end of each hinge half by a rivet. Hardware mounting strips M and M' are conveniently formed of metal, such as being extruded from an aluminum or magnesium alloy in long strips which are cut to length and bent to a shape to conform to the portion of flange 25 to which they are to be attached. Although any suitable cross section may be utilized for strips M and M', strip M is preferably wider than strip M', since when the case is closed, the strip M will extend into the groove 34 between outside rib R and flange 25 of the shell S', as in FIGS. 6–11. Thus, strip M may be provided with a thicker inside section 40 which abuts against the radial ribs 33 of shell S, which thereby act as stops to facilitate installation of the strips M. Each strip M may also be provided with a section 41 of intermediate thickness, which may extend past the position of rivets 35 and slightly beyond the edge of flange 25, with a thinner section 42 and a tapered section 43 on the opposite side. Tapered section 43 forms a tongue which extends into groove 34 of shell S' and abuts against the radial ribs 33 thereof, as in FIG. 6. The strip M' is merely a flat strip with an upstanding flange 44 at one edge which extends around and against the edge of flange 25 of shell S'. The intermediate section 41 of strip M has a width such that it will, if desired, engage the strip M', or even the flange 25 of shell S', while the thinner section 42 accommodates the heads of rivets 36 for the opposite strip M'. The outer surface of strip M may also be provided with a shallow recess or depression, between the thicker section 40 and the tongue 43, in which, if desired, a strip of plastic corresponding in color to the shells S and S' may be secured, as by adhesive, not only for decorative purposes but also to cover the heads of rivets 35. Rivets 35 may, of course, be countersunk when such a decorative strip is utilized. Also, the outer surface of each strip M may be provided with longitudinally extending, shallow grooves or striations, or any other configuration to produce an aesthetic pattern.

Figure 8:
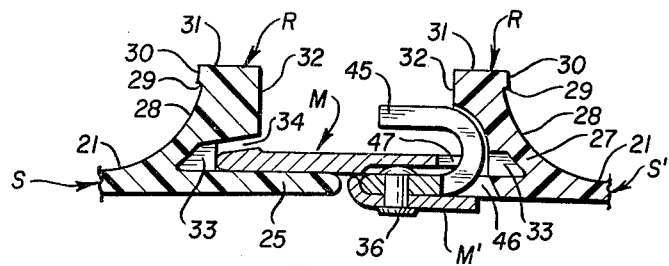
FIG. 8 is a central fragmentary section, on an enlarged scale, taken along line 8—8 of FIG. 2 at the position of one of the latches but omitting the latch itself for clarity of illustration.
Figure 9:
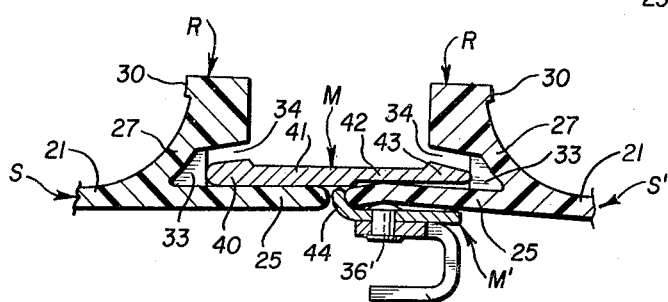
FIG. 9 is a central fragmentary section, on an enlarged scale, taken along line 9—9 of FIG. 2 at a position between a latch and the handle and showing a support for a divider pad.

Latches 10 and also handle supports 13 are attached to strip M, as by rivets which extend through both strip M and flange 25, while a conventional catch 45 may be mounted on strip M', as in FIG. 8, opposite each latch 10, by a spaced pair of rivets 36, only one of which is shown. Catch 45 may correspond in thickness to flange 25 of shell S' and may be accommodated by a cutout 46 in flange 25 and rib R, as well as by a cutout 47 in strip M. A divider pad catch 48 of FIG. 9 may also be mounted, as by a pair of rivets 36', one of which is shown, on the underside of strip M' at two positions spaced from the center of the top of the case, and corresponding to the position of FIG. 9. As in FIGS. 12 and 13, apron 38 provides an inside cover for hinge H, particularly when the case is open and may be formed of conventional material, such as cloth, or of plastic as shown. Each edge of apron 38 may be reinforced, for attachment purposes, by a strip 49 of plastic or fibre board. Divider pad P may be conventional and formed of cloth with metal rod reinforcing, or partly of plastic and partly of cloth, as shown.

Hinge pin 15 is offset laterally from the centerline of the case for a dual purpose; first, to facilitate opening and closing of the case, since strip M extends past the inner edge of shell S for a distance sufficient to enter groove 34 of shell S' and abut radial ribs 33; and second, to permit feet F to interfit and act as stops to limit opening of the case. Thus, hinge half 17 is right angular in cross section, to abut rib R of shell S' and ears 16 thereof are placed as closely as possible to the rib, while hinge half 18 is much wider, extending across the space to flange 25 of shell S in angular steps. As indicated previously, hinge H is longitudinally elongated, so that a single hinge pin 15 may be utilized, although two or more, shorter hinges may be utilized. Also, strips M and M' may extend completely around each shell, with hinge H or several hinges being attached thereto.

Each foot F, as in FIGS. 3 and 13, may comprise a pair of laterally converging sides 50 connected to an end wall 51, integral with the corresponding shell and sides 50 merging with ribs R. The lower edge 52 of each foot may be provided with an outer boss 53, as in FIG. 13, which may be smooth surfaced to complement the decorative effect of the lateral boss 30 of rib R. Also, the lower edge 52 is formed with a dihedral angle, as in FIG. 13, the inner portion of which, of the feet of shell S', abuts the rib R of shell S to limit the opening movement of the case. When placed in upright position, case rests primarily on the lower edge of end wall 51 of each foot, thereby increasing stability, and the sides 50 of each foot reinforce the end wall 51, which reinforcement is assisted by the rib R, with which the sides 50 merge. Through the sides 50 and their connection with the ribs R, which are, of course, in turn located quite close to the hinge H and the strips M and M', the transfer of the load produced by the weight of the luggage case and its contents to the lower edges of foot ends 51 is more even, so that localized distortion of one of the shells, at a position directly above one of the end walls 51 of a foot F, is generally avoided.

As described previously, the shells S and S' are identical, being formed in the same mold and merely placed in opposing position in the final assembly. It will be noted that, if the hinge pin were located at the center of the bottom, i.e. centered between the bottoms of ribs R, when the case is opened, the opposed feet would abut each other, with the lower edge of one foot theoretically engaged with the lower edge of the opposite foot. However, the lower edges of sides 50 and end walls 51 are rather narrow, so that there would be a tendency for one foot to slip inside the opposite foot, thereby permitting one end of the case, for instance, to open further than the opposite end. This undesirable condition is avoided by the off center position of hinge pin 15, as in FIG. 13, since, as shown, the feet F of shell S' interfit within the feet F of shell S. In addition, the lower edges of sides 50 of feet F of shell S' abut against rib R of shell S, thereby providing positive engagement, which is not affected by any slight longitudinal displacement of one foot F.

The side wall 23 of each shell may be provided, on the inside, with a generally rectangular surface area 55 bounded by a raised bead 56, as in FIGS. 4 and 13. The raised bead 56 is readily molded into the shell, with a limited height, such as one-sixteenth inch. In order to provide a more finished appearance to the inside of the case, luggage cases are normally provided with a lining. However, this lining is more markedly visible over the area of the inside of the side wall, as will be evident from FIG. 4. Thus, a lining 57, as of a desired fabric, may be readily attached, as by adhesive, to the surface area 55 within the confines of raised bead 56, as in FIG. 13. Ordinarily, such a lining is bound at the edges, but the expense of binding the edges of lining 57 may be avoided through use of the raised bead 56, since the raised bead 56 prevents the edge of the lining from being loosened through inadvertent impact with the edge of the lining. Since the lining 57 of FIG. 13 extends to the raised bead on all sides, attachment of the lining is also facilitated.

It will be understood, of course, that numerous variations may be made in the luggage case of this invention, particularly in the cross section of the reinforcing, molded ribs and the character and point of attachment of the hardware mounting strips. For instance, as illustrated in FIG. 14, each rib R' may include a generally rectangular, outwardly extending section 59 and a lateral section 60, with the hardware mounting strips being adapted to be attached to the shells during molding, as by injection molding. Thus, each of the hardware mounting strips may be provided with an inverted U-shaped portion 61 which encloses the outer section 59 on three sides, and the free end of which extends between the sections 59 and 60. Each of these strips may also be provided with a lug 62 embedded in the rib section 60, for locking purposes. The hardware mounting strips are respectively provided with a laterally extending flange 63 or 64, which flanges interfit at a tongue and groove joint 65 with the case sections closed. As will be evident, the shells are identical and thus may be made in the same mold, but with one half of the shells molded with one of the strips in the mold and the other half of the shells molded with the opposite strip in the mold. The different configuration of the flanges 63 and 64 at the joint 65 should not cause any difficulty during molding, since the flanges 63 and 64 may be arranged to extend from the mold during molding. The handle and latches may be attached to either flange 63 or to flange 64, while the catches for the latches, such as corresponding to catch 45 of FIG. 8, may be mounted on the opposite flange 63 or 64. Also, the hinge, or a plurality of hinges if desired, may be modified from the construction shown for hinge H, for attachment to the flanges 63 and 64, or to the portions 61 of the hardware mounting strips.

As illustrated in FIG. 15, ribs R″ are similar to ribs R, previously described, but with the throat section eliminated, although the same may be included, if desired. An integral lateral flange 66 extends inwardly from the base of one rib, while an integral lateral flange 67 extends inwardly from the base of the opposite rib, with a hardware mounting and sealing strip 68 attached to the underside of one flange, such as flange 67, as by a series of rivets 35. Flange 66 overlaps flange 67 at a joint 69, at a position opposite strip 68. It will be noted that, in the cross section shown in FIG. 15, the opposed shells are dissimilar at the flange joint 69, and this will normally require a separate mold for each shell. The handle and latches may be attached to flange 66 and hardware mounting strip 68 by the same rivets which attach strip 68 to the flange, while one half of the hinge or hinges, along the bottom of the case, may be attached to flange 66 by the same rivets which attach strip 68 to flange 67, with the hinge half or halves attached to flange 67 acting as hardware mounting strips themselves.

In the construction illustrated in FIG. 16, ribs R″ may again be similar to ribs R, described previously, except for the absence of the throat section, and the shells incorporating the ribs R″ may be formed in different molds, to accommodate the attachment of hardware mounting and spacing strips 69 and 70. Each strip 69 and 70 has a T-head 71 embedded in the corresponding rib, while a notch 72, at the inside of strip 69, accommodates the beveled edge of strip 70 and a corresponding notch 72′, on the outside of strip 70, accommodates the beveled edge of strip 69. In the alternative embodiment illustrated in FIG. 16, the handle and latches may be attached to the outside strip 69, which is notched at the position of a catch for each of the latches and may also be reduced in width along the bottom to accommodate the hinge half which is attached to inside strip 70, the opposite half of the hinge or hinges being attached to strip 69. It will be noted that the hardware attached to ouside strip 69 will require rivets which are countersunk on the inside of strip 69, or other suitable fastening devices which will clear strip 70 as the case closes.

As illustrated in FIG. 17, each overhanging rib R, similar to ribs R in having a throat section 27 and an outer concave surface 28, may be surmounted by an inverted U-shaped strip 74, which need have only a minimum thickness and have angular flanges 75. Strips 74 may be attached to ribs R during molding, or the flanges 75 may be crimped or rolled into engagement with the corresponding rib. Also, a single hardware mounting strip M″, similar to strip M of FIG. 6 but having approximately the same thickness adjacent both edges, may be attached to the flange 25 of one shell, as by rivets 35, and extend into the groove between the overhanging rib R and flange 25 of the opposite shell. The construction of FIG. 17, of course, permits both shells to be made in the same mold.

In the construction illustrated in FIG. 18, a single molded flange 25′ extends from a rib R″ of one shell to engage a notch 76 formed beneath the rib R″ of the opposite shell. Ribs R″ are similar to ribs R″ of FIGS. 16 and 17. In this construction, the shells may be formed in different molds, or the flange 25′ and notch 76 may alternate between the shells, around the inner periphery thereof; or the flange 25′ may be provided on one half of the top, one end and one half of the bottom of one shell, and notch 76 around the remainder of that shell, with flange 25′ provided on the opposite halves of the top and bottom and the opposite end of the other shell and notch 76 around the remainder of the opposite shell. It will be noted that, since the opposite shell is reversed in position, when it is opposed to the first shell, both may be made in the same mold.

A modification of the construction illustrated in FIG. 18 is shown in FIG. 19, in which each shell is provided with a similar rib R″ and one shell with a flange 78 which fits beneath a flange 79 of the opposite shell, with the edge of flange 79 being received in a groove 80 beneath the rib of the opposite shell, and an underside notch 81 accommodating the edge of flange 78. The shells of FIG. 19 may be provided with the respective flanges 78 and 79 extending completely around the periphery of each, thus requiring separate molds for the shells; or flange 78 may extend along one half of the top and bottom and the corresponding end of one shell and flange 79 along the remainder of the shell, with flanges 78 and 79 being reversed for the opposite shell, so that two shells from the same mold will interfit, when placed in opposing position. Flanges 78 and 79 may also alternate between the shells, for lesser distances than one half the periphery of the shells.

In the construction illustrated in FIG. 20, the shells may be identical and therefore formed in the same mold, each being provided with a rib R and laterally extending flange 25, similar to shells S and S′ described previously. However, the hardware mounting strips 82 and 83, attached to the respective flanges 25 by rivets 35, may be modified from those described previously, each extending into the groove 34 beneath rib R and having a hook-shaped flange 84 which extends around the edge of shell flange 25. The inner edges of strips 82 and 83 are irregular in shape, but formed so as to fit together at a joint 85, which acts also to seal the case sections when closed.

The construction of FIG. 21 has ribs R″ similar to those of FIG. 17 and a relatively narrow, inwardly extending flange 25″ at the base of each rib. Only one hardware mounting strip M″ is utilized, having a groove 86 on one side, which receives the corresponding flange 25″ and is attached thereto, as by a series of rivets 35, and a groove 87 on the opposite side, adapted to engage and disengage flange 25″ of the opposite shell. In this construction, the shells are identical and therefore may be formed in the same mold.

The construction of FIG. 22 utilizes heavier strips 82′ and 83′ which are interlocked with a rib R‴ of the corresponding shell, as by an inside, narrow flange 88, and an outside, hook-shaped flange 89, to which the inner edges of ribs R‴ conform in shape. The strips 82′ and 83′ may be placed in the mold, to be attached to the shells during molding. At their inner edges, the strips 82′ and 83′ may interfit for sealing and guiding purposes at a joint 85′, which is irregular in shape, as shown, with one of the strips having a tongue 90. Although the strips 82′ and 83′ differ, the shells for the construction of FIG. 22 may be made in the same mold, since the ribs R″ are identical in configuration.

In the construction of FIG. 23, the shells are again identical and thus may be made in the same mold, each outwardly extending rib R1 and R2 having a throat section 27 and a concave outer surface 28, but including a rod 92, which may be formed of metal and attached through molding, as by a series of spaced, depending hooks 93 extending into each rib and the material flowing around the inside of each rod, as at 94. It will be noted that a portion of the rod 92 is visible in the outer edge of each rib, thus giving a different decorative appearance to the construction. Each of the shells is also provided with a laterally extending flange 25, while a hardware mounting strip M'''' is attached, as during molding, to one shell only, with hooks 93 of the corresponding rod being accommodated by a longitudinal groove 95. Strip M'''' is also provided with an inside flange 96 engaging the underside of the flange 25 of the shell to which it is attached, as well as oppositely extending, spaced flanges 97 and 98, with flange 97 adapted to fit into the groove beneath the throat 27 of the opposite rib and flange 98 being oblique, to insure that flange 98 is guided into the correct closing position. It will be noted that the underside of hooks 93, of rib R1, lock strip M'''' in position, while the underside of hooks 93, of rib R2, engage flange 97 during closing.

In the construction illustrated in FIG. 24, the ribs R2 and R3 of the opposed shells are different in configuration, thus requiring different molds, although rib R2 of FIG. 24 is similar to rib R2 of FIG. 23, thus having a rod 92 provided with depending hooks 93 embedded therein. Throat section 27 of rib R2 may be eliminated in rib R3, whose embedded rod 92' has longer hooks 93'. Also, an inwardly extending flange 100, integral with the material 94' which extends between and around the legs of hooks 93', overlaps flange 25 of the opposite shell. Since one half of the circumference of each rod 92 and 92' extends above the outer surface of the corresponding rib, rather than being recessed therein, a slightly different decorative effect than that of FIG. 23 is produced.

In the construction illustrated in FIG. 25, ribs R4 and R5 are not identical, so that the shells would normally be made in different molds. Both ribs have a concavely slanting, outer surface, but the throat section may be omitted, while a rod 92'' having depending hooks 93'' which are located at the inside of the corresponding rib, are embedded in each rib during molding. For closing purposes, rib R4 may be provided with an inwardly extending flange 101 which is integral with the inside of a block 102 of plastic enclosing the legs of hooks 93'' and which is adapted to extend beneath a plastic block 103 of rib R5 and enclosing the legs of hooks 92''. In the construction of FIG. 25, as in the construction of FIG. 24, adequate attachment of the handle to one of the reinforcing strips or to one of the inwardly extending flanges may be found to be slightly difficult. Thus, this construction will probably be preferred for use in connection with the train or beauty type of luggage case, in which the handle is attached centrally to the center of the upper case section.

As will be evident, other embodiments and other variations of this invention may exist.

What is claimed is:

1. A luggage case having opposed concave sections attached together along one wall for pivotal movement and removably attached together along the opposite wall, wherein:
   each said case section is provided with depending feet at corresponding positions for supporting said case with said sections closed, said feet each having a depending outer end and depending sides converging outwardly toward said end and positioned directly opposite the corresponding foot of the other case section; and
   hinge means attaching said sections together for pivotal movement about an axis spaced from a centerline between said sections, thereby preventing said feet of one case section abutting directly the corresponding feet of the opposite case section when said case sections are opened but instead to interfit.

2. A luggage case as defined in claim 1, wherein:
   each case section includes a shell having integral top, bottom and end walls connected to a side wall and a rib extending outwardly from and adjacent the edges of said top, bottom and end walls; and
   said feet are integral with the bottom wall of the corresponding case section and each foot merges at the inner ends thereof with said rib.

3. A luggage case having opposed concave sections attached together along one wall for pivotal movement and removably attached together along the opposite wall, wherein:
   each case section includes a shell having integral top, bottom and end walls connected to a side wall;
   an outwardly extending rib is molded integrally with at least said top and end walls of each shell, is generally perpendicular to said walls and is disposed adjacent the edges of said shells, said ribs being generally parallel to said side walls and extending outwardly from said shell a distance greater than the thickness of said shell adjacent thereto, thereby providing a reinforcement for each shell;
   a hardware attaching flange extends laterally from at least one said shell adjacent the inner edge of the corresponding rib and toward the opposite shell; and
   said opposite shell has means interfitting with the edge of said flange with said case sections closed, said ribs then being in generally parallel, spaced apart relation.

4. A luggage case as defined in claim 3, wherein said opposite shell is provided with:
   an integral flange extending toward said one shell with said case sections closed; and
   a groove adjacent said integral flange for receiving the edge of said hardware attaching flange.

5. A luggage case as defined in claim 3, wherein:
   each said shell is provided with said hardware attaching flange, each said hardware attaching flange including a strip attached to the corresponding rib and substantially enclosing the outer periphery of said rib.

6. A luggage case having opposed concave sections attached together along one wall for pivotal movement and removably attached together along the opposite wall, wherein:
   each case section includes a shell having integral top, bottom and end walls connected to a side wall;
   an integral rib extends outwardly from the top, bottom and end walls of each shell and is disposed at least adjacent the edges thereof to provide reinforcing means for the corresponding shell;
   each shell has an integral, generally lateral flange extending from a position adjacent said rib and toward the opposite case section;
   each case section is provided with hardware mounting strip means attached to and extending along the corresponding lateral flange; and
   one said hardware mounting strip means is wider than the opposite hardware mounting strip means and overlaps at least a portion of said opposite strip means, with said case sections closed, for a majority of the periphery of said sections.

7. A luggage case as defined in claim 6, wherein:
   at least a portion of said hardware mounting strip means includes a hinge having pivotally connected halves attached to the corresponding lateral flange at predetermined positions adjacent the bottom walls of said shells.

8. A luggage case as defined in claim 7, wherein:
   said hinge pivotal connection is offset from the inner edge of one lateral flange.

9. A luggage case as defined in claim 6, wherein:
   each said rib is provided with a throat section connecting said rib with the adjacent shell wall and providing a space on the underside; and
   said wider strip is mounted partly in said throat section space of one shell, being attached to said flange of said one shell, and extends into said throat section space of the opposite shell with said case sections closed.

10. A luggage case having opposed concave sections attached together along one wall for pivotal movement and removably attached together along the opposite wall, wherein:
- each case section includes a shell having integral top, bottom and end walls connected to a side wall;
- an integrally molded rib extends outwardly from the top, bottom and end walls of each shell and is disposed at least adjacent the edges thereof to provide reinforcing means for the corresponding shell;
- each shell has an integral, generally lateral flange extending from a position adjacent said rib and toward the opposite case section; and
- a hardware mounting strip is attached to said flange of one shell only and overlaps said flange of the opposite shell with said case sections closed.

11. A luggage case having opposed concave sections attached together along one wall for pivotal movement and removably attached together along the opposite wall, wherein:
- each case section includes a shell having integral top, bottom and end walls connected to a side wall;
- an integral rib extends outwardly from the top, bottom and end walls of each shell and is disposed at least adjacent the edges thereof to provide reinforcing means for the corresponding shell;
- each shell has an integral, generally lateral flange extending from a position adjacent said rib and toward the opposite case section;
- said lateral flanges overlap with said sections closed; and
- one shell has a groove between its rib and its lateral flange to receive the edge of said lateral flange of the opposite shell with said sections closed.

12. A luggage case having opposed concave sections attached together along one wall for pivotal movement and removably attached together along the opposite wall, wherein:
- each case sections includes a shell having integral top, bottom and end walls connected to a side wall;
- an integral rib extends outwardly from the top, bottom and end walls of each shell and is disposed at least adjacent the edges thereof to provide reinforcing means for the corresponding shell;
- each shell has an integral, generally lateral flange extending from a position adjacent said rib and toward the opposite case section; and
- hardware mounting strips are attached to the respective flanges and have interfitting, opposed edges.

13. A luggage case having opposed concave sections attached together along one wall for pivotal movement and removably attached together along the opposite wall, wherein:
- each case section includes a shell having integral top, bottom and end walls connected to a side wall;
- an integrally molded rib extends outwardly from the top, bottom and end walls of each shell and is disposed at least adjacent the edges thereof to provide reinforcing means for the corresponding shell;
- each shell has an integral, generally lateral flange extending from a position adjacent said rib and toward the opposite case section; and
- a hardware mounting strip is attached to said flange of one shell and has a lateral groove for receiving said flange of the opposite shell with said case sections closed.

14. A luggage case having opposed concave sections attached together along one wall for pivotal movement and removably attached together along the opposite wall, wherein:
- each case section includes a shell having integral top, bottom and end walls connected to a side wall;
- an integral rib extends outwardly from the top, bottom and end walls of each shell and is disposed at least adjacent the edges thereof to provide reinforcing means for the corresponding shell;
- each shell has an integral, generally lateral flange extending from a position adjacent said rib and toward the opposite case section;
- each said rib overhangs said lateral flange on the inside;
- a hardware mounting strip attached to one said flange is provided with a groove for receiving the opposite flange with said case sections closed; and
- a rod-like member provided with depending hooks is embedded in each rib.

15. A luggage case having opposed concave sections attached together along one wall for pivotal movement and removably attached together along the opposite wall, wherein:
- each case section includes a shell having integral top, bottom and end walls connected to a side wall;
- reinforcing means integral with said top, bottom and end walls is disposed at least adjacent the edges thereof, said reinforcing means including a rib extending outwardly from the corresponding walls of said shell;
- said rib of each said shell is provided with a member embedded in said rib with a lateral flange extending from the inner edge of one said rib; and
- said opposite rib forms a groove for receiving the edge of said lateral flange with said case sections closed.

16. A luggage case having opposed concave sections attached together along one wall for pivotal movement and removably attached together along the opposite wall, wherein:
- each case section includes a shell having integral top, bottom and end walls connected to a side wall;
- reinforcing means integral with said top, bottom and end walls is disposed at least adjacent the edges thereof, said reinforcing means including a rib extending outwardly from the corresponding walls of said shell; and
- the outer edge of each rib is provided with a strip having flanges embedded in said rib.

17. A luggage case having opposed concave sections attached together along one wall for pivotal movement and removably attached together along the opposite wall, wherein:
- each case section includes a shell having integral top, bottom and end walls connected to a side wall;
- reinforcing means integral with said top, bottom and end walls is disposed at least adjacent the edges thereof, said reinforcing means including a rib extending outwardly from the corresponding walls of said shell;
- a hardware mounting strip is attached to each rib and extends laterally toward the opposite shell; and
- a portion of each strip is embedded in said rib.

18. A luggage case as defined in claim 17, wherein:
each said strip substantially encloses the outer periphery of the corresponding rib.

References Cited

UNITED STATES PATENTS

| | | | |
|---|---|---|---|
| 3,432,012 | 3/1969 | Winter | 190—49 |
| 3,405,788 | 10/1968 | Alford | 190—49 |
| 2,200,972 | 5/1940 | Stein | 190—49 |
| 2,777,245 | 1/1957 | Aaron et al. | 190—41 |
| 2,785,797 | 3/1957 | Rice. | |
| 2,878,907 | 3/1959 | Kivett | 190—49 |
| 2,950,792 | 8/1960 | Axtell | 190—49 |
| 3,135,366 | 6/1964 | Holtzman | 190—41 |

DONALD F. NORTON, Primary Examiner

U.S. Cl. X.R.

190—41, 49